(12) United States Patent
Singh Chauhan et al.

(10) Patent No.: US 12,294,756 B2
(45) Date of Patent: May 6, 2025

(54) SYSTEM AND METHOD FOR FACILITATING AN ENABLING OF A DEVICE FUNCTIONALITY

(71) Applicant: UNIVERSAL ELECTRONICS INC., Santa Ana, CA (US)

(72) Inventors: Varun Pratap Singh Chauhan, Agra (IN); Sarika Desai, Blore (IN)

(73) Assignee: UNIVERSAL ELECTRONICS INC., Santa Ana, CA (US)

(*) Notice: Subject to any disclaimer, the term of this patent is extended or adjusted under 35 U.S.C. 154(b) by 85 days.

(21) Appl. No.: 17/028,606

(22) Filed: Sep. 22, 2020

(65) Prior Publication Data

US 2022/0095005 A1    Mar. 24, 2022

(51) Int. Cl.
*H04N 21/41* (2011.01)
*G08C 17/02* (2006.01)
*H04L 12/28* (2006.01)
*H04N 21/422* (2011.01)

(52) U.S. Cl.
CPC ....... *H04N 21/41265* (2020.08); *G08C 17/02* (2013.01); *H04L 12/2807* (2013.01); *H04L 12/2823* (2013.01); *H04N 21/42204* (2013.01)

(58) Field of Classification Search
CPC ....... H04N 21/41265; H04N 21/42204; H04N 5/4403; H04N 5/44; G08C 17/02; H04L 12/2807; H04L 12/2823
USPC ........................................ 348/734
See application file for complete search history.

(56) References Cited

U.S. PATENT DOCUMENTS

| | | | |
|---|---|---|---|
| 6,052,750 A * | 4/2000 | Lea | H04L 12/2814 710/72 |
| 8,243,207 B2 | 8/2012 | Arling | |
| 8,918,719 B2 | 12/2014 | Hilbrink | |
| 9,019,435 B2 * | 4/2015 | Barnett | H04N 21/42216 348/734 |
| 9,215,394 B2 | 12/2015 | Barnett | |
| 9,503,562 B2 | 11/2016 | Negron | |
| 9,600,082 B1 | 3/2017 | Ledet | |
| 9,715,821 B2 * | 7/2017 | Gilson | G08C 17/02 |
| 9,852,615 B2 | 12/2017 | Perez | |
| 10,447,537 B2 * | 10/2019 | Asnis | H04L 43/0817 |
| 2014/0023375 A1 | 1/2014 | Gilson | |
| 2018/0167762 A1 | 6/2018 | Hatambeiki | |
| 2018/0098110 A1 | 7/2018 | Arling | |

(Continued)

FOREIGN PATENT DOCUMENTS

| | | |
|---|---|---|
| KR | 20090074860 A | 7/2009 |
| WO | 2020171245 A1 | 8/2020 |

OTHER PUBLICATIONS

U.S. Appl. No. 12/406,601, filed Mar. 18, 2009, entitled System and method for Appliance Control Via a personal Communication or Entertainment Device, now U.S. Pat. No. 9,503,562.

(Continued)

*Primary Examiner* — Trang U Tran
(74) *Attorney, Agent, or Firm* — Greenberg Traurig, LLP

(57) ABSTRACT

A system and method facilitates an enabling of a functionality of a first device by causing a first data that identifies the first device to be used to determine that the first device supports the functionality, determining that the functionality of the first device is not enabled, and causing a set of instructions for enabling the functionality of the first device to be presented to a user.

18 Claims, 8 Drawing Sheets

(56) References Cited

U.S. PATENT DOCUMENTS

2020/0044922 A1    2/2020   Asnis
2020/0168079 A1    5/2020   Arling
2020/0259887 A1    8/2020   Hatambeiki
2021/0344994 A1   11/2021   Choi

OTHER PUBLICATIONS

U.S. Appl. No. 13/071,661, filed Mar. 25, 2011, entitled "System and method for Facilitating Appliance Control via a Smart Device", now U.S. Pat. No. 9,852,615.
U.S. Appl. No. 13/329,940, filed Dec. 19, 2011, entitled "Graphical User Interface and Data Transfer Methods in a Controlling Device", now U.S. Pat. No. 8,918,719.
U.S. Appl. No. 13/657,176, filed Oct. 22, 2012, entitled "System and Method for Optimized Appliance Control", now U.S. Pat. No. 9,215,394.
U.S. Appl. No. 15/377,274, filed Dec. 13, 2016, entitled "Apparatus, System and Method for Promoting Apps to Smart Devices", now U.S. Pat. No. 2018-0167762.
U.S. Appl. No. 16/816,483, filed Mar. 12, 2020, entitled "Universal Voice Assistant", now Published U.S. Pat. No. 2020/0259887.
Extended European Search Report from application No. 21873138.8, dated Jan. 18, 2024, 19 pp.

* cited by examiner

SYSTEM AND METHOD FOR FACILITATING AN ENABLING OF A DEVICE FUNCTIONALITY

BACKGROUND

Systems and methods for obtaining information about appliances that are included within a given environment, such as the home, are known in the art. Most often, such information is obtained to configure or "set-up" a controlling device. In this regard, a controlling device is typically configured by being provisioned with an appropriate set of command data, from within a library of command data sets, for each of the specific appliances to be controlled. The appliance identifying information in such a system is typically information that serves to identify each appliance by its make, and/or model, and/or type.

SUMMARY

Described hereinafter are systems and/or methods that use appliance identifying data (and possibly other environmental data, such as appliance state related data, network related data, and the like) to provide additional services to a consumer. For example, a contemplated system—which preferably includes a voice assistant—will use such appliance identifying data (and other data as applicable) to provide a means to help a consumer in correcting problems within the environment, such as interconnectivity and/or interoperability problems. A further, contemplated system will use such appliance identifying data (and other data as applicable) to provide a means for assisting a consumer in the selection of additions and/or replacements to an existing environmental configuration, recommendations for preferred interconnections, supplemental capabilities (such as apps), etc. A yet further, contemplated system will cause an icon to be presented on the home page of a Smart TV where the icon represents a brand or product paying for the ad whereupon, when a consumer clicks on the ad, a voice assistant will interact with the consumer to find the best and most personalized product offering under the brand, typically considering such appliance identifying data (and other data as applicable).

A better understanding of the objects, advantages, features, properties and relationships of the hereinafter described systems/methods will be obtained from the following detailed description and accompanying drawings which set forth illustrative embodiments and which are indicative of the various ways in which the principles of the described systems/methods may be employed.

BRIEF DESCRIPTION OF THE DRAWINGS

For a better understanding of the various aspects of the described systems and methods, reference may be had to preferred embodiments shown in the attached drawings in which.

Figures I and 2 illustrate example systems in which a standalone controlling device may be utilized to command operation of several appliances.

DETAILED DESCRIPTION

The following describes systems and methods for providing technical support and home appliance recommendations to a consumer.

Figure 1:
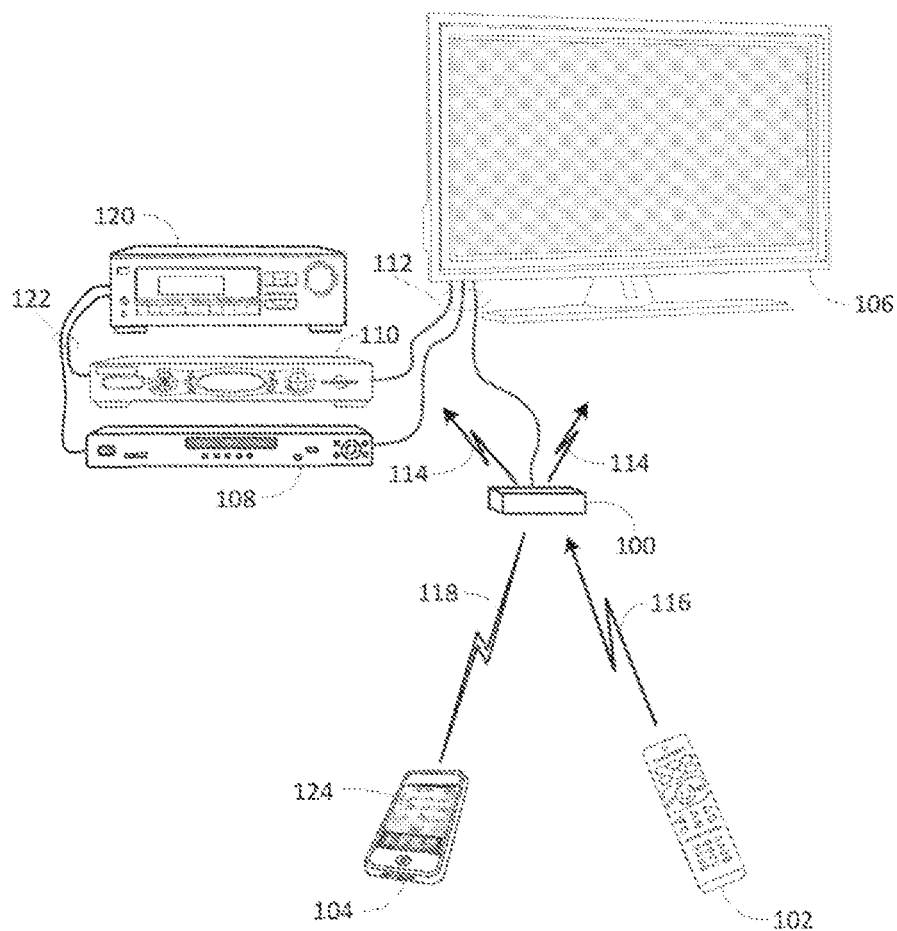

With reference to FIG. 1, there is illustrated an example system in which a controlling device 100 may be used to issue commands to control various controllable appliances, such as a television 106, a cable set top box combined with a digital video recorder ("STB/DVR") 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. Thus, it will be understood that the subject system and method may be used in connection with various components associated with a smart home, i.e., components usable to provide home automation, as well as components associated with an AV system.

In the illustrative example of FIG. 1, appliance commands may be issued by device 100 in response to infrared ("IR") request signals 116 received from a remote control device 102, radio frequency ("RF") request signals 118 received from smart device 104 having a resident remote control app 124, or any other device from which device 100 may be adapted to receive requests, using any appropriate communication method. In some instance, the device 100 further supports an intelligent voice assistant, such as described in U.S. Ser. No. 16/816,483, which is incorporated herein by reference in its entirety, whereby the device 100 will be capable of issuing commands to the appliances in response to voice commands uttered by a user—whether received directly from the user or indirectly from an intermediate device. As illustrated, transmission of the requested appliance commands from the device to appliances 106, 108, 112, 120 may take the form of wireless IR signals 114 or CEC commands issued over a wired HDMI interface 112, as appropriate to the capabilities of the particular appliance to which each command may be directed. Communications and device discovery may also use IP interfaces, underlying technologies such as "Thread," a low-power wireless mesh networking protocol, and/or the like without limitation. It will also be understood that the devices may support additional or alternative communication interfaces such as Zigbee or Z-Wave, etc.

In the example system illustrated in FIG. 1, AV receiver 120 may not support HDMI inputs, being connected to audio source appliances 108,110 via S/PDIF interfaces 122. Accordingly, device 100 may be constrained to transmit all commands destined for AV receiver 120 exclusively as IR or RF signals, while commands destined for the other appliances 106 through 110 may take the form of either CEC or IR signals as appropriate for each command. It is also to be understood that certain TV manufacturers may elect not to support volume adjustment via CEC. If the illustrative TV 106 is of such manufacture, device 100 may relay volume adjustment requests to TV 106 as IR signals 114, while other requests such as power on/off or input selections may be relayed in the form of CEC commands over HDMI connection 112. Thus, it will be understood that the described system will be aware of, and may adapt itself to operate in a manner that depends in whole or in part upon, the appliances within the environment, the capabilities of those appliances, the manner in which the appliances are connected, etc.

It is also to be appreciated that, while illustrated in the context of IR, RF, and wired CEC signal transmissions, in general, transmissions to and from device 100 may take the form of any convenient IR, RF, hardwired, point-to-point, or networked protocol, as necessary for a particular embodiment. Further, while wireless communications 116, 118, etc., between exemplary devices are illustrated herein as direct links, it should be appreciated that in some instances such communication may take place via a local area network or personal area network, and as such may involve various intermediary devices such as routers, bridges, access points, etc. Since these items are not necessary for an understanding of the instant disclosure, they are omitted from this and subsequent Figures for the sake of clarity.

Since remote control apps installable on smart devices, such as that contemplated in the illustrative device 104 are well known, for the sake of brevity the operation, features, and functions thereof will not be described in detail herein. Nevertheless, if a more complete understanding of the nature of such apps is desired, the interested reader may turn to, for example, U.S. patent application Ser. No. 12/406,601, U.S. patent application Ser. No. 13/329,940, (now U.S. Pat. No. 8,243,207), and Ser. No. 15/377,274, the disclosures of which are incorporated herein by reference in their entirety.

Figure 2:
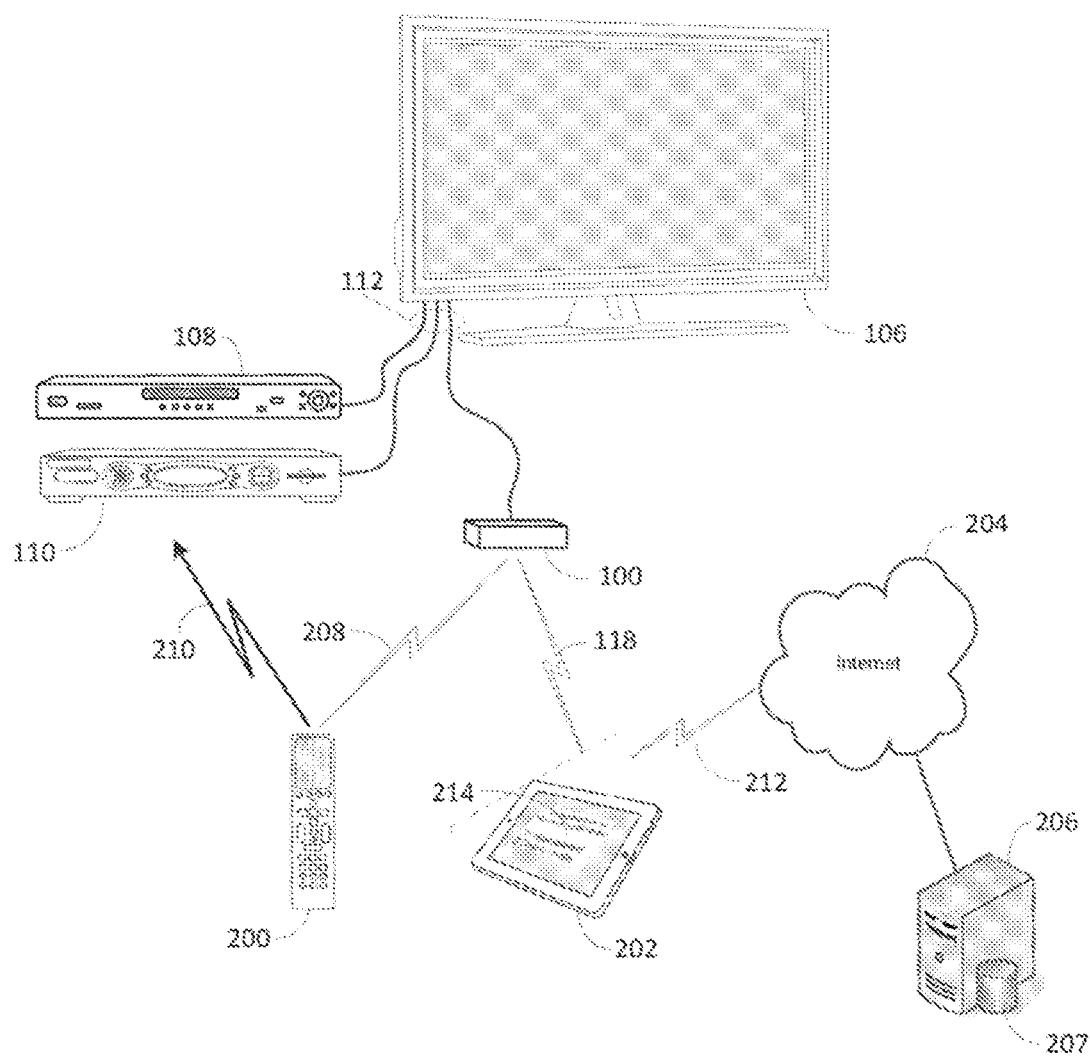

Turning now to FIG. 2, in a further illustrative embodiment, device 100 may receive wireless request signals from a remote control 200 and/or an app resident on a tablet computer 202. As before, command transmissions to appliances 106, 108, 110 may take the form of wired CEC commands or wireless IR and/or RF commands. However, in this example remote control 200 may be in bi-directional communication 208 with device 100 and accordingly the device 100 may delegate the transmission of IR commands 210 to the device 200, i.e., use remote control 200 as a relay device for those commands determined to be best executed via IR and/or RF transmissions. As also generally illustrated in FIG. 2, a setup app 214 executing on a smart device such as tablet computer 202 may be utilized in conjunction with an Internet (212, 204) accessible or cloud based server 206 and associated database 207 to initially configure device 100 for operation with the specific group of appliances to be controlled, i.e., to communicate to device 100 a matching command code set and capability profile for each particular appliance to be controlled, for example based on type, manufacture, model number, etc.

Figure 3:
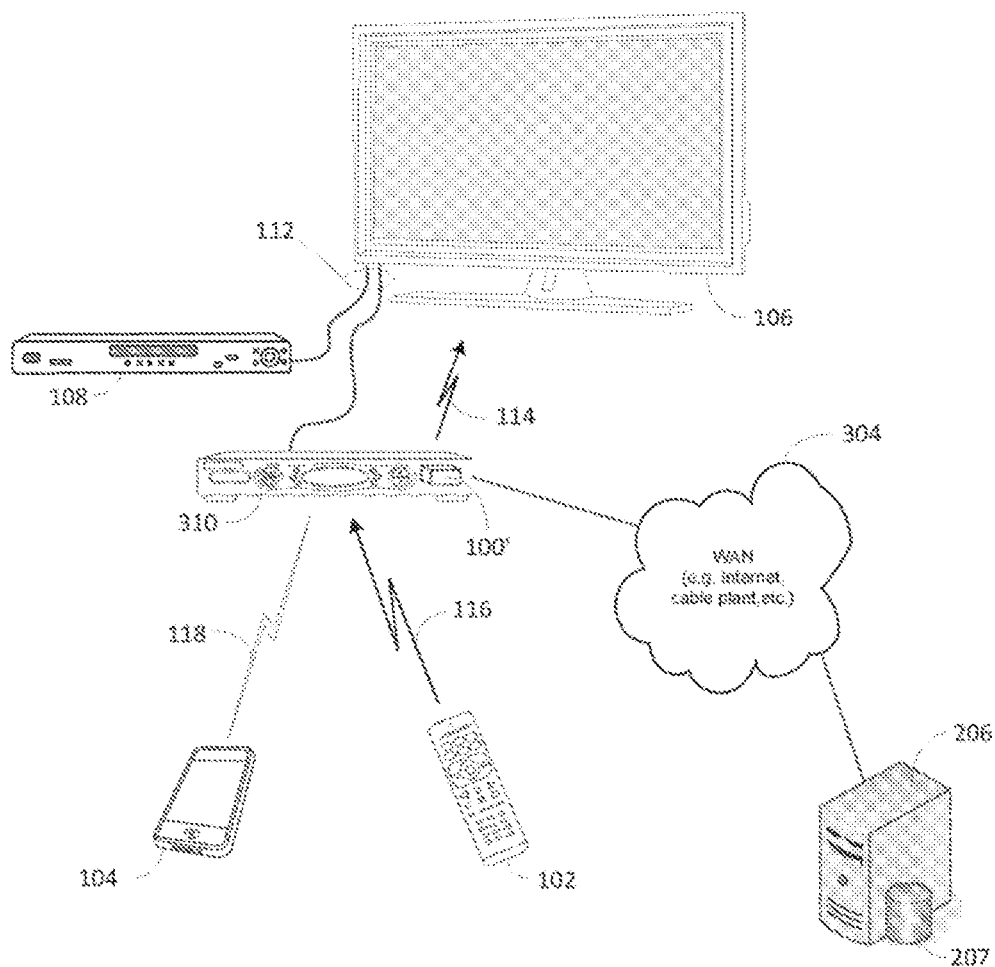
FIGS. 3 and 4 illustrate example systems in which controlling device functionality may be incorporated into an appliance which is part of a home entertainment system.

With reference to FIG. 3, in a further illustrative embodiment the aforementioned remote control functionality may be provided by one or more modules 100' embedded in a consumer electronic device, for example STB/DVR 310. When modules 100' are embedded in a consumer electronic device, the device is considered to be functionally equivalent to the above described device 100. As such, when device 100 is referenced, the accompany description will be understood to be equally applicable to an appliance having the embedded modules 100'.

In the example illustrated in FIG. 3 remote control 102 and/or smart device 104 may transmit wireless request signals directly to STB/DVR 310 for action by the built-in functional module(s) 100', which actions may, as before, comprise CEC command transmissions via HDMI connection 112 or IR command transmissions 114, originating in this instance from an IR blaster provisioned to the STB/DVR appliance 310. Additionally, the module 100' may itself include voice assistance capabilities and/or may cooperate with a voice assistant otherwise included within the appliance and/or the system more generally to allow for the issuance of commands in response to voice prompts being received from a user. In this configuration, a set up application resident in STB/DVR 310 may be utilized to configure functional module(s) 100', using for example an Internet connection 304 accessible through a cable modem and/or cable distribution system headend.

Figure 4:
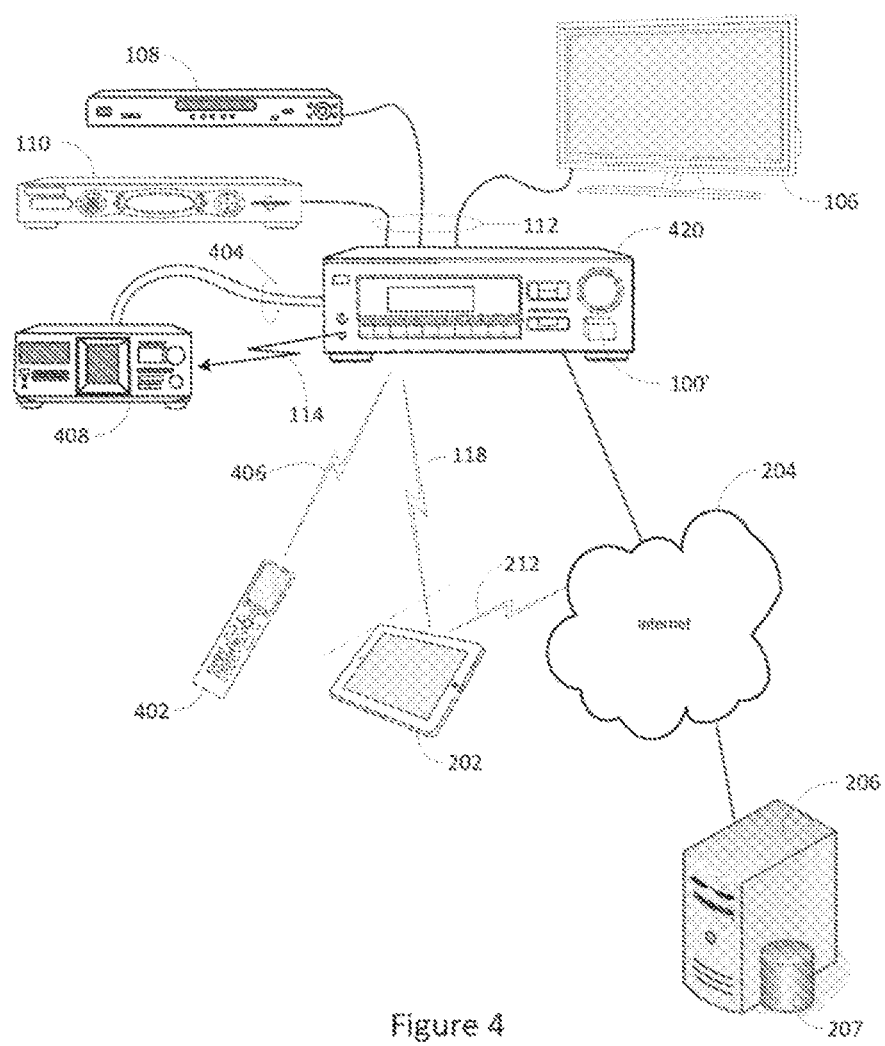

In the further illustrative embodiment of FIG. 4, the functional module(s) 100' may be embedded in an AV receiver 420 which may serve as an HDMI switch between various content sources such as a STB/DVR 110 or a DVD player 108 and a rendering device such as TV 106. In addition to HDMI inputs, AV receiver 420 may also support various other input and output formats via use of appropriate ports, for example analog inputs such as the illustrative 404 from CD player 408; composite or component video; S/PDIF coaxial or fiberoptic; etc. In this embodiment, request signals 406 may be directed to AV receiver 420, for example from remote control 402, for action by functional module(s) 100'. As before, resulting appliance commands may be transmitted using CEC signals transmitted over HDMI connections 112, or via IR signals 114 transmitted from an associated IR blaster. As appropriate for a particular embodiment, initial configuration of the functional module (s) 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying functional concept, for example the functional modules 100' may be incorporated into an Internet-capable TV, an HDMI switch, a game console, etc.; appliance command set and capability database 207 may be located at an internet cloud or a cable system headend, may be stored locally (in all or in part), which local storage may take the form of internal memory within the controlling device itself or in an appliance such as a TV, STB or AV receiver, or may take the form of a memory stick or the like attachable to a smart device or appliance; etc.

Figure 5:
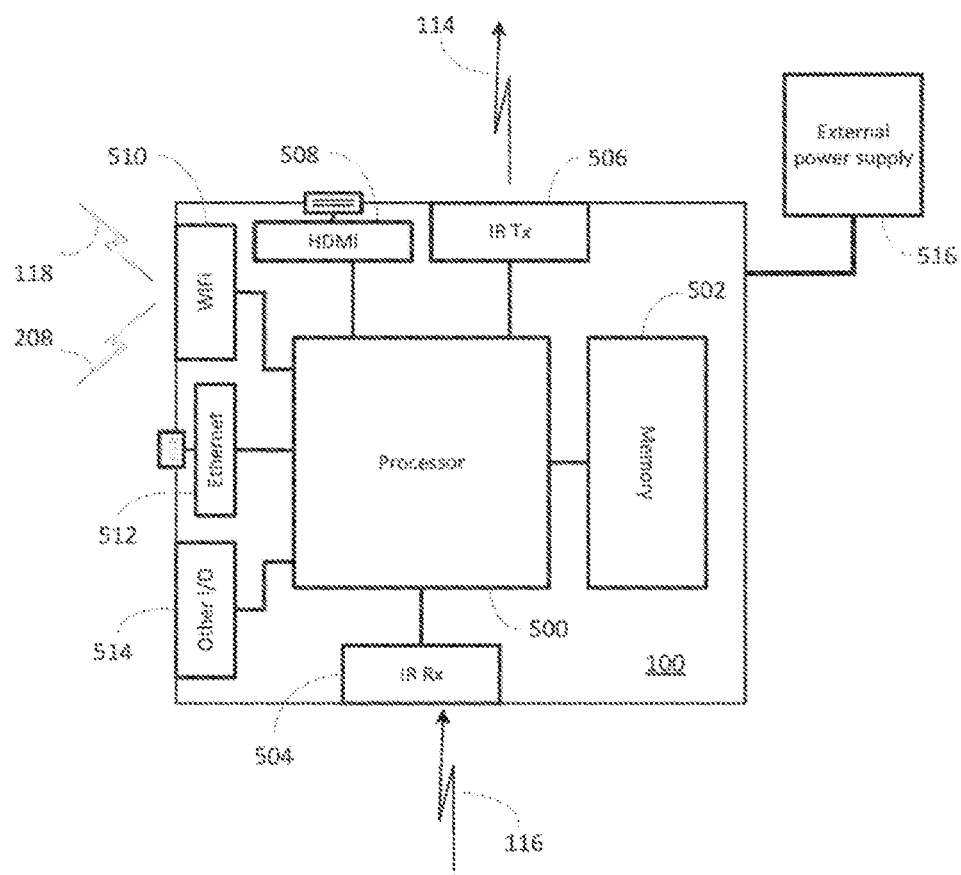
FIG. 5 illustrates a block diagram of an example controlling device.

With reference to FIG. 5, an example controlling device 100 (whether embodied as a standalone device or in an appliance supporting the functionality provided via use of embedded functional module(s) 100') includes, as needed for a particular application, a processor 500 coupled to a memory 502 which memory may comprise a combination of ROM memory, RAM memory, and/or non-volatile read/write memory which memories may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the example platform may include IR receiver circuitry 504 and IR transmitter circuitry 506; an HDMI interface 508; a WiFi transceiver and interface 510; an Ethernet interface 512; and any other wired or wireless I/O interface(s) 514 as appropriate for a particular embodiment, by way of example without limitation Bluetooth, RF4CE, USB, Zigbee, Zensys, X10/Insteon, HomePlug, HomePNA, etc. The device 100 may additionally include a microphone for receiving audio commands from a consumer. The electronic components comprising the example device 100 (which herein also is being used to reference an appliance having functional module(s) 100') may be powered by an external power source 516. In the case of a standalone device 100, this may comprise for example a compact AC adapter "wall wart," while a controlling device that is in the form of integrated functional module(s) 100' may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

It will also be understood by those skilled in the art, some or all of the memory 502 may include executable instructions that are intended to be executed by the processor 500 to control the operation of the host device as well as data which serves to define the necessary control protocols and command values for use in transmitting command signals from the host device to controllable appliances (collectively, the command data). In this manner, the processor 500 may be programmed to control the various electronic components within the exemplary device 100 or device hosting the functional module(s) 100', e.g., to monitor the communication means 504, 510 for incoming request messages from controlling devices, to cause the transmission of appliance command signals, etc.

To cause the host device to perform an action, the host device may be adapted to be responsive to events, such as a received audible communication from a consumer, a command transmitted from the remote control 102 or smart device 104, changes in connected appliance status reported over the networked ecosystem, HDMI interface 508, WiFi interface 510, or Ethernet interface 512, etc. In response to an event, appropriate instructions within the functional programming of the host device may be executed. For example, when a command request is received from a smart phone 104, the functional programming may retrieve from the command data stored in memory 502 a preferred command transmission medium (e.g., IR, CEC over HDMI, IP over WiFi, etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the functional programming in order to facilitate adjustment of appliance settings to match user-defined activity profiles, e.g. "Watch TV", "View a movie", etc. In some instances, a customized user experience can be provided as described in U.S. Ser. No. 16/656,153 which is incorporated herein by reference in its entirety.

Figure 6:
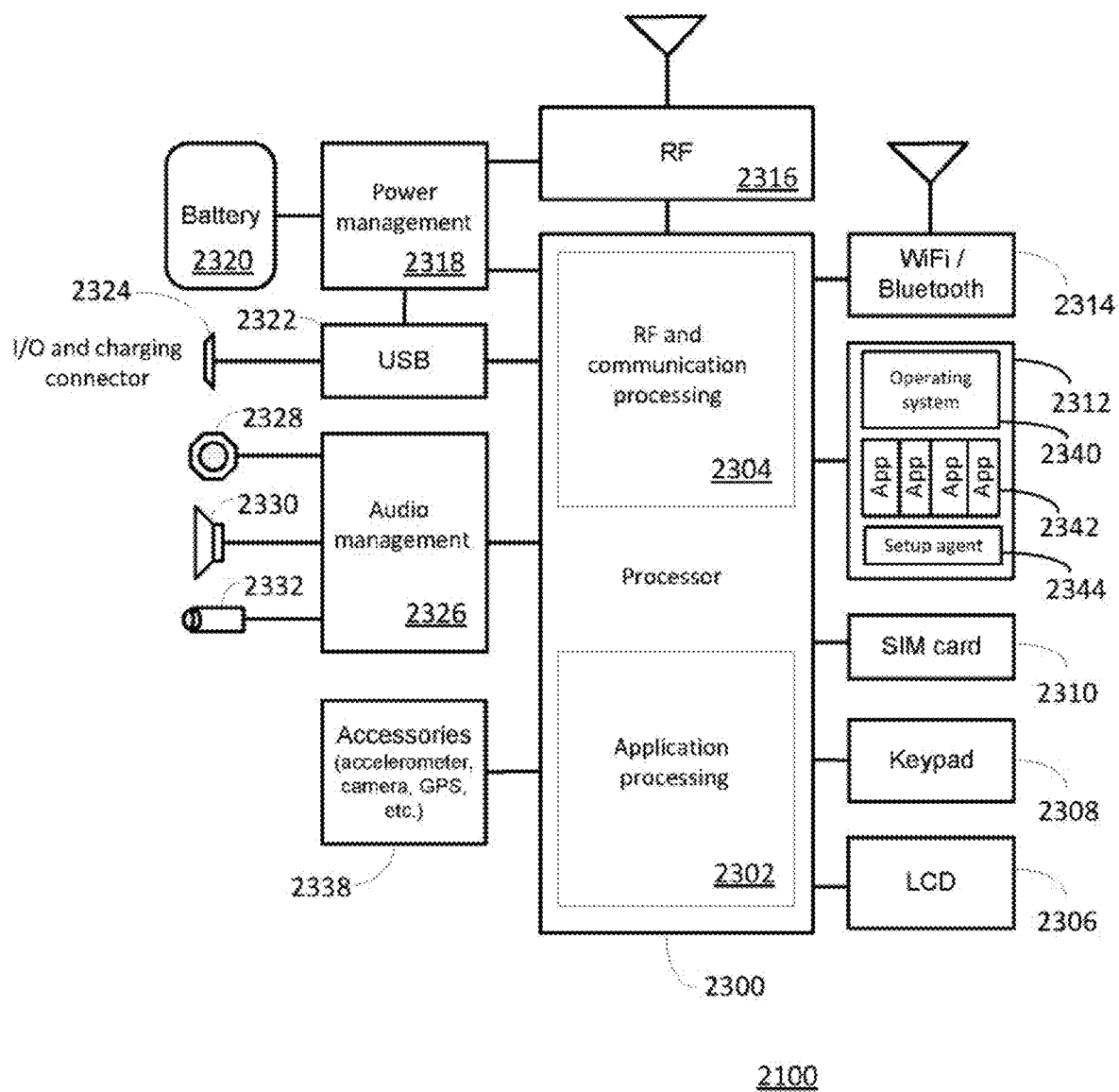
FIG. 6 illustrates a block diagram of a further example controlling device, particularly one suited for supporting a virtual voice assistant.

With reference to FIG. 6, a further example of a controlling device 100 (or appliance supporting the controlling device functionality 100') includes, as needed for a particular application, processing means 2300 which may comprise both an application processing section 2302 and an RF/communication processing section 2304; an LCD display 2306; a keypad 2308 which may comprise physical keys, touch keys overlaying LCD 2306, or a combination thereof; one or more microphones, a subscriber identification module (SIM) card 2310; memory means 2312 which may comprise ROM, RAM, Flash, or any combination thereof; "WIFI" and/or "BLUETOOTH" wireless interface(s) 2314; a wireless telephony interface 2316; power management circuitry 2318 with associated battery 2320; a "USB" interface 2322 and connector 2324; an audio management system 2326 with associated microphone 2328, speaker 2330 and headphone jack 2332; and various optional accessory features 2338 such as a digital camera, GPS, accelerometer, etc. As will be appreciated, the associated microphone can be an integral component of the device or may be remote located and wired or wirelessly coupled to the device. Programming may be provided and stored in memory means 2312 to control the operation of the controlling device 2100 by way of operating system 2340 software such as for example iOS, Android, Linux, Web apps, etc., which operating software may support voice-enabled control as sell as the download and execution of various add-on apps 2342 as necessary for a particular purpose. A setup agent software 2344 may also be provisioned to controlling device 100 in order to facilitate detection, installation, and operation of manufacturer-supplied appliance interface apps. It is also to be understood that, while the illustrated smart device 100 is particularly adapted to receive input via use of a keypad and/or touchpad display that is provided as an integral part of the controlling device 100, the controlling device 100, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 7:
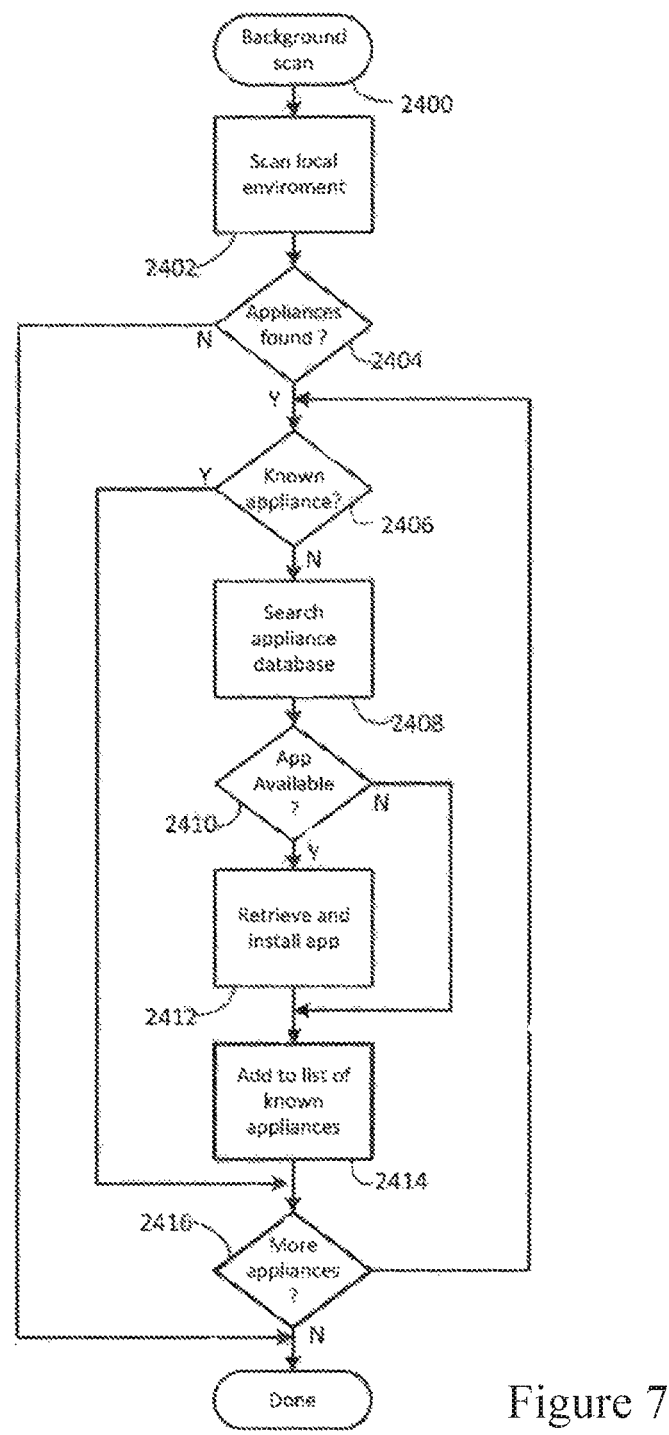
FIG. 7 illustrates an example method for installing an appliance related app.

With reference now to the flowchart of FIG. 7, at step 2400 the setup agent 2344 included with or otherwise associated with the controlling device functionality of the controlling device 100 may periodically initiate a scan 2402 of its current wired and/or wireless network environment (e.g., "WIFI," "BLUETOOTH,", etc. or any combination thereof) in order to ascertain the presence of one or more networked appliances. This action may be initiated automatically (for example based on a timer which is used to measure predetermined periods of time, in response to the device being turned on, in response to a detected change in location of the device using for example its GPS or the like type of functionality, etc.), or when connecting to new networks, or may be manually initiated by a user of device 100 (for example in response to an activation of a user input element, in response to the device 100 being moved, etc.) as appropriate for a particular embodiment. If it is determined at step 2404 that no responsive appliances are present in the environment, the setup agent actions are complete. If, however, responsive devices are detected on the wireless network, e.g., a device responds with data indicative of its identity in response to a polling request message sent from the device 100, then at step 2406 the setup agent may next determine, using the information received, if the responsive appliance is already known to the setup agent, e.g., determine if the appliance has already been detected during a previous detection operation or otherwise manually indicated to the device 100. Such a determination may be made, for example, by consulting a setup agent-administered listing of appliance identities. If the appliance is already known to the setup agent, processing continues at step 2416 to determine if further responsive appliances have been detected.

If it is determined that a newly-responsive appliance has been detected, then at steps 2408 and 2410 the setup agent may next determine if an app is available for that appliance. Such a determination may be made, for example, by using vendor information, a third party compatibility database, or by a social network database which may contain related appliance information updated by other users or by searching a database that functions to cross-reference appliance identifying data as would be received from the appliances (e.g., data indicative of a manufacturer and model number) to available apps and locations from which such apps may be download. Such a database may be stored in local memory 2312 as part of the setup agent programming, may be located at a cloud based data storage facility or server 2116, or a combination thereof, as appropriate for a particular embodiment. It will also be understood that such appliance identifying information may also be cross-referenced within the database to capability information for that appliance. Capability information may include information that would normally be included in an owner's manual and/or engineering specification for the appliance and such information may include, without limitation, schematic diagrams, hardware and software component identifications, supported protocol information, etc.

If no app is available, processing continues at step 2414, adding the instant appliance identity to the listing of known appliance identities. If it determined that an app is available, at step 2412 the appropriate app may be recommended to the user or may be downloaded to the device 100 from a location indicated in the database entry, e.g., a location pointed to by use of a URL, IP address, etc. As will be appreciated, depending on the particular implementation such a download and install may be performed automatically by the setup agent, or the agent may first present the download possibility to the user of device 100 for confirmation. As will also be appreciated, in those instances where the app download is sourced from a site which requires user sign-in and/or authentication, such as for example the "iTunes" brand store or "Android Marketplace" brand store, user credentials may be pre-loaded into the setup agent program to facilitate such automatic download or may be requested from smart device user each time download is to be performed.

When an app is downloaded and installed, in some embodiments the setup agent may register that app with a cloud based service, by way of forwarding unique identity information regarding the app and the environment (e.g., network and/or app owner information) in which it is operational to a server system such as for example the server. Such registration information may be subsequently utilized for the purpose of synchronizing multiple instances of the same app across different Operating Systems.

Next, at step 2414, the setup agent may add the current appliance identity or appliance fingerprint into a local tabulation of known appliances. Such an identity may comprise a serial number, MAC address, or any other data value suitable to uniquely identify the appliance. Thereafter, at step 2416 the setup agent may ascertain if additional responsive appliances were detected and, if so the process described above is repeated, until all responding appliances have been accounted for.

In some embodiments, provision may also be made within the setup agent programming to allow a user to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated app is deleted by the user of the smart device; etc.

In some embodiments, the setup agent may simply provide an already installed remote control app with the command code sets (or links to command code sets) needed to control one or more of the appliances within the ecosystem. Furthermore, in conjunction with the installation of certain apps which require specific equipment configurations, the setup may also generate macro command sequences as necessary to place various appliances into the required state upon initiation of the app and/or upon activation of a predetermined input element associated with the app. By way of illustration without limitation, a TV viewing or game show participation app may require that a TV to be set to a particular input and/or a cable set top box be tuned to a particular channel, etc., in which case a command sequence ("macro") may be created by the setup agent to be executed every time that app is initiated. As will be understood by those skilled in the art, a single GUI may display all of the app links and common macros across the system. Since methods for control of entertainment appliances and/or use of macros are well known in the art, these will not be discussed further herein, however for additional information the interested reader may turn to for example U.S. patent application Ser. No. 13/657,176 "System and Method for Optimized Appliance Control" or Ser. No. 13/071,661 "System and Method for Facilitating Appliance Control via a Smart Device", both of common ownership and both incorporated herein by reference in their entirety.

In some circumstances, once the system is configured, the system may monitor for appliance responses (or lack of appliance responses) to the transmission of commands (alone or included in a programmed macro command sequence) for the purpose of attempting to automatically (or via user instruction) rectify any programming, interconnectivity, interoperability, and/or device configuration problems that may exist within the system. For example, as described in US 2018/0098110, using keypress notification data/command transmission notification data, the operating software of an appliance, such as an AV receiver, may be adapted to monitor the AV inputs and outputs for the expected result of a user or system initiated command. If the expected result does not occur, a virtual voice assistant associated with the appliance/system may inform the user of the error, may prompt the user to retry the command, to check the operating mode of controlling device 100, etc. In this manner, if the currently selected activity is "Watch a Movie" and the operating software of AV receiver is notified by controlling device 100 that the "Play" key has been actuated, the operating software of the AV receiver may inspect the DVD player input to discern if a corresponding change in AV input data has occurred, for example an audio component has become present in a digital data stream where there was none before, and, if an error is detected, the operating software of the AV receiver may interact with the user to notify the user of the problem and to attempt to guide the user in the performance of corrective measures, generally considering the capability information for the devices. In circumstances where the appliance software is capable of automatically rectifying the discerned problem, for example having the ability to cause a command to be transmitted to change a state of the remote control, an appliance within the system, a network connection, etc., such action can be performed. Similarly, the operating software may monitor the reported user activity on controlling device 100 for patterns indicative of a problem, such as repeated actuation of the "Play" key 204 within a short space of time which would indicate to the system that an expected appliance response has not occurred. Yet further, the virtual voice assistant may listen for key words that are indicative of a problem, such as keywords found in a user "why won't the movie play?" and may use such key words, and the capability information retrieved for the system, to try and solve the problem, such as by guiding a user to change the input of the TV to the DVD player, etc.

As noted, a voice platform enabled device 100 can be used to discover an appliance and, after the appliance is discovered, a finger print for the appliance, e.g., manufacturer information, brand information, device type information, device model information, firmware version information, supported control interface information, information about a supported app running on the device, information about a supported app running on the device 100 for use with the device, and/or the like information usable to uniquely identify an appliance, may be used to retrieve one or more apps (which apps may include or provide access to appropriate command data, formatting information, etc. as needed) for providing voice control capabilities to the system. Furthermore, it is contemplated that, in some instances, an appliance discovery process can be utilized as described above for the purpose of determining if an appliance supports control via a voice enabled platform, e.g., to determine if the appliance is an "ALEXA" cloud-based, voice serving platform compatible device and, in the event the device 100 does not have the appropriate software for supporting that device already installed thereon, e.g., the "ALEXA" cloud-based, voice service platform software, the "SIRI" cloud-based, voice service platform supporting software, the "GOOGLE ASSISTANT" cloud-based, voice service platform software, the device 100 may be caused to first install such software in memory whereupon execution of that software may be used to perform further device discovery for use in obtaining one or more apps (also known as a "skill," "Action," or the like) for use in connection with the voice service platform supporting software to thereby configure the device 100 to communicate with that appliance. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

In a similar manner, a voice platform enabled device 100 can be used to discover a service and, after the service is discovered, a fingerprint for the service, e.g., manufacturer information, brand information, information about an app running on the appliance, and/or the like information usable to uniquely identify a service, may be used to retrieve one or more apps (which apps may include or provide access to appropriate command data, formatting information, etc. as needed) for providing voice control capabilities to the system. Furthermore, it is contemplated that, in some instances, a service discovery process can be utilized as described above for the purpose of determining if an appliance supports a service that is controllable via a voice enabled platform, e.g., to determine if the appliance supports an "ALEXA" cloud-based voice serving platform compatible service and, in the event the device 100 does not have the appropriate software for supporting that service already installed thereon, e.g., the "ALEXA" cloud-based voice service platform software, the "SIRI" cloud-based voice service platform supporting software, the "GOOGLE ASSISTANT" cloud-based voice service platform software, the device 100 may be caused to first install such software in memory whereupon execution of that software may be used to perform further service discovery for use in obtaining one or more apps (also known as a "skill," "Action," or the like as noted above) for use in connection with the voice service platform supporting software to thereby configure the device 100 to communicate with that service and/or other appliances within the system. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

It is further contemplated that the system may listen for and/or solicit the user to speak keywords for this same purpose. In this regard, the keywords might not only include the above noted information usable to form a fingerprint for an appliance and/or a service but might also include keywords that are known to be recognizable by a specific cloud-based, voice service platform. For example, upon the user speaking a wake work specific to a given type of digital assistant, e.g., "Alexa," "Hey Google," Hey Siri," Hey Xfinity" or the like, the system may cause the operating software associated with that digital assistant to be provided to the device 100 for installation (or may cause such operating software to be enabled if already resident of the device 100) and, if needed or desired, the operating software for the voice enabled platform, once operating on the device 100, can be used to perform further appliance and/or service detection processes for use in connection with configuring the device 100 with apps usable to communicate with such appliance and/or services as described above.

For use in identifying the appropriate operating software and/or apps that are to be provisioned to the device 100 as a part of these above-described processes, the database additionally cross-references fingerprint information to such operating software and/or apps. As noted previously, the database may be stored in memory of a local device and/or stored in memory associated with a server device that is accessible via a wide-area-network, e.g., stored in database associated with a cloud-computer service. In this manner, information needed to locate and download the appropriate operating software and/or apps can be deduced by a device and used to retrieve such software and/or apps from its own memory and/or memory associated with still further services, e.g., from a database associated with a third party server. It is also contemplated that any such software and/or app providing service can track owner information, e.g., log-in information, privileges, appliance(s) registered to the user, etc., to limit the ability to access and download apps, to seamlessly integrate downloaded and installed apps into the system, etc. For example, a cloud service provided for the noted purposes may function to authenticate a user when they log into the service and thereafter, using device and/or service discovery information received from one or more devices on the user's system, establish an ownership mapping between the user, the smart device, and appliances/services that will be included in the user's "connected" environment. Again, such gathered information can be used in connection with attempting to trouble shoot any errors with the system that are raised by a user or otherwise automatically discerned.

As will be further understood by those of skill in the art, when using an app lookup API it is feasible for the voice assistant operating on the voice enabled platform of device 100 to notify and recommend to a user a skill, accessory, etc. for use with an appliance or service that was recently added to a network, e.g., a local area network, and/or to notify and recommend to a user a newly available skill, accessory, etc. for use with an appliance or service that was previously added to a network. The availability of such skills or the like can be indicated to the user on the device 100, such as by having the device 100 display a special illumination pattern via use of LEDs, via an audible a notification, or the like. A user can then ask the voice assistant to check what the notification is about, which will lead to a recommendation whereupon the user can voice an acknowledgement to permit installation of the skill, to purchase the accessory, etc. The purchase or an item (and installation of a skill if so purchased) can be performed via use of a cloud API call using input parameters such as the user identification, device 100 ID, skill ID, and the like as needed for any particular purpose. Alternatively, a user may also set a policy that any matched skills are allowed to be installed automatically in which case the smart device 100 will skip the skill recommendation and invoke the skill installation API when a new, matching skill is discovered without further user intervention.

As noted above, when the device 100 is associated with a virtual, voice assistant, the device 100 can function to determine if the user is having problems with the system, e.g., the virtual voice assistant hears the user use one or more words that are recognized by the system as being indicative of a problem or otherwise automatically notes a problem. In this regard, it is contemplated that the virtual voice assistant installed on one or more appliances within the home may function to act as a $1^{st}$ stage tech support module. The tech support module will use the appliance and/or app capability information for the one or more appliances and/or apps within the home, network and communications related information, etc, retrieved/discerned as a result of a performance of one or more of the aforementioned discovery processes, to try and solve any problems the user may be experiencing, whether automatically or by guiding the user through the appropriate corrective steps.

For example, considering a case when a controlling device is being provisioned into a smart home system and the system learns that a compatibility problem exists between appliances within the ecosystem (whether by being learned from utterance(s) of the user or by being learned from an evaluation of system capabilities, communications, and appliance states), the app may determine to display a set of steps on the display device and/or speak to the user in an attempt to correct the problem (e.g. the HDMI port does not support 4 k). The instructions may ask the user for further information as needed and would provide to the user the steps for the user to manually correct the problem. In some circumstances, the voice enabled assistant may communicate commands to other apps within the system to automatically address the perceived problem.

In another example, the system may determine (from user comments, via a microphone, or otherwise) that speakers connected via HDMI to the TV are not producing sound and the cloud service may determine based on information obtained from the TV that ARC is not enabled on the TV. The UI generated by the app would then provide the user instructions on how to activate the ARC operation on the TV if the app does not itself have capability to issue the commands (in this case, a series of menu navigation commands) that would be needed to automatically perform this operation. Additionally, an image of an auto port selection hub with ARC support may be suggested to the user for purchasing in keeping with the below.

In instances when a problem is not correctable by modifying a state of one or more appliances, the network, and/or the like, the system may recommend that the user obtain other product for addition into the system. For example, an accessory such as an HDMI hub may be displayed as an image (a photo) that allows the user to select and purchase the accessory to address a learned interconnectivity problem. In some cases, the system may also recommend product to simply provide a more robust smart home system, e.g., to allow the system to use capabilities that are being underutilized. The identify data of each discovered device is thus used by a cloud service and is analyzed to determine what data to send to the agent for the agent to provide error correction instructions and recommendations as needed.

In a preferred embodiment, the virtual voice assisted agent would always run in the background and would proactively launch a user interface when a problem is encountered, e.g., the systems learns of an appliance that is not responding to issued commands as expected/desired, the system hears a user utter one or more key words, etc. The agent would then proactively suggest a cure to the perceived problem. For example, to provide a better viewing experience for the user, such as when the user is watching a movie and the agent/server determines that there are smart lights on in the same room, the agent may suggest to the user that the lights can be automatically dimmed while the movie is being watched and may then respond to a request received from the user to dim the lights by sending the appropriate command(s) to a control module associated with such lights, etc.

The agent may be a separate app embedded in the device containing the controlling device functionality 100' and the app may be automatically downloaded to an appliance as part of the provisioning operation described above The app may also be installed on a cell phone and perform the analysis of the detected devices partially or wholly on the phone or via use of a cloud service.

By way of further example, considering a consumer electronic device that has capabilities associated with HDMI version 2.0 and an appliance having at least one port that supports HDMI version 2.0 capabilities (which means the appliance supports 4K video and another HDMI port that supports a lower version of HDMI capabilities, i.e., a port that does not support 4K video, the functional programming may use the consumer electronic device identifying information to determine that the consumer electronic device is 4K video capable as described in U.S. Ser. No. 16/743,219, which is incorporated herein by reference in its entirety. Next, having determined that the consumer electronic device is 4K capable, the method would check to determine if the consumer electronic device is connected to a 4K capable port of the appliance, e.g., does the current state indicate that the appliance is connected to one of HDMI port 1 or HDMI port 2 of the appliance. To this end, the voice enabled assistant may instruct the user to place the consumer electronic device into a known state and may then cause a scan of the ports of the appliance to determine the port to which the consumer electronic device is connected as described previously. Using the determined port capability information obtained from the appliance signature database, it would then be determined if the determined port to which the consumer electronic device is connected is a 4K capable port of the appliance, e.g., is one of HDMI port 1 or HDMI port 2. When it is determined that the port to which the appliance is connected is not a 4K capable port of the appliance, the voice enabled platform may then instruct the user, via use of an audio or visual instruction, to reconnect the consumer electronic device to one of HDMI port 1 or HDMI 2 port to thereby allow the user to fully utilize the capabilities of the consumer electronic device. As will be appreciated, as the system may recognize that HDMI port 1 or HDMI port 2 is already connected to another consumer electronic device, the system may function to recommend only an available port to the user. Furthermore, as the system may use the same process to determine that another consumer electronic device is coupled to an incompatible port, e.g., that a non-4K capable appliance is coupled to a 4K capable port, the system may further instruct the use to reconnect the another appliance to a different, more appropriate port of the consumer electronic device while instructing the user to use the now-free port to connect the consumer electronic device of interest.

As will be appreciated, the foregoing describes an example method in which a virtual voice assistant is used to optimize a utilization of a home entertainment system having at least a first device that causes a first data that identifies the first device, e.g., a device fingerprint, to be used to identify within a data store a one or more capabilities of the first device, e.g., port capabilities, that receives a voice input having one or more keywords that have been pre-associated within the data store to an operational problem associated with at least the first device, e.g., the picture on the TV is not working, that causes a state of at least the first device at a time at which the voice input is received to be identified, e.g., the second device is not plugged into the appropriate port on the TV, that causes the one or more keywords, the one or more capabilities of the first device, and the state of at least the first device to be used to identify within the data store a set of instructions for interacting with at least the first device to solve the operational problem, e.g., to instruct the user to reconnect the second device to the correct port of the first device, and that causes the set of instructions to be presented to a user.

In some instances where a consumer electronic device or appliance is not found in the consumer electronic device or appliance signature database, it will be appreciated that the system may use a machine learning process to attempt to predict a capability of the consumer electronic device via use of any consumer electronic device/appliance identifying data provide thereto for this purpose. In addition, it will also be appreciated that some capability information may be determined by analyzing data exchanges between appliances without the need to reference a particular database. For example, by analyzing EDID data, such as the data value provided for the amount of active or addressable horizontal pixels, it can be determined whether a port is 4K capable, e.g., a value below a threshold value—such as 1920—can indicate the port is not 4K capable.

Finally, in the event that is determined that no port of the appliance is capable of supporting the capabilities of a given consumer electronic device, the system can function to recommend additional appliances for purchase and/or integration into the system of the user as described in U.S. Pat. No. 9,600,082.

In further circumstances, the appliance detection operation may utilize a determined bandwidth (e.g., 18 Gbps or 48 Gbps and/or supported frame rate) to determine the attributes that would be needed by an appliance to provide the best user experience when the appliance is connected thru an HDMI cable. In this scenario, the database may be polled to obtain the recommended attribute information and the recommended attribute information can be used to automatically enable/disable certain features and/or settings, such as CEC, ARC, Internet over HDMI, framerate, etc., or to otherwise notify the user that manual enabling/disabling of certain features and/or settings would be desirable. Likewise, the database may be polled to obtain hardware recommendations, e.g., the user may be informed that using an ultra-high speed cable and connecting that cable to HDMI2 would provide the best user experience at 4 k at 60 Hz and that the user should not use a determined current set up of 4 k @30 Hz. Similarly, the system can recommend (for example when a video game console is detected) that the user setup the system to perform at 120 frames per second (fps) but at a lower resolution when gaming is made active (or cause such action to be performed automatically) while also using the obtained information to inform the user that using an ultra-high speed HDMI cable in this instance would not provide a better user experience.

It is also contemplated that, when an appliance does not support all of the latest HDMI features to provide the best user experience at the time that the appliance was set up, when/if the firmware of the appliance is updated, the steps described above can be repeated in order to provision the system in a manner that will provide the latest recommendations to the user to obtain the best user experience. In some circumstances, the steps can be caused to be repeated automatically in response to such a firmware update.

In a further example, the voice enable assistant may offer a user a choice between a product recommendation and a product compatibility check. In this context, a product recommendation comprises a review of the items in a user's current equipment configuration with the objective of generally suggesting improvements and/or additions to the user's current equipment configuration; while a compatibly check comprises a review of a particular user-specified product which is not currently part of an equipment configuration, with the objective of determining if this item is compatible with the existing equipment as currently configured. By interacting with the voice enable assistant, a user may be provided with an opportunity to further limit these reviews to only certain appliances or functionalities, for example audio or video appliances or functionalities.

Considering first the product recommendation mode, it will be appreciated that the steps comprising the review algorithm may be performed locally on the device 100, performed remotely at an associated server, or a combination thereof as appropriate for a particular embodiment. Similarly, it will be understood that data indicative of the current equipment configuration and data used for reference during the review process may be either locally resident on the device 100 or hosted by a server, in any convenient combination all as described above. In determining the adequacy of an existing configuration an exemplary review algorithm may, for instance when applied to the illustrative AV system configuration, consider capability factors such as:

Ability to support currently available (and/or future) formats, e.g., HDTV, Blu-ray DVD, DTS audio, 3DTV, etc.;

Ability to support currently available (and/or future) content delivery methods, e.g., on-line video and audio streaming services, IPTV, HD radio, etc.;

Ability to support currently available (and/or future) connectivity, e.g., HDMI, WiFi and/or Ethernet capability, USB and SD card interfaces, etc.;

Energy efficiency; and

Inconsistencies in the existing configuration, e.g., an HD DVR or Blu-ray player connected to an SD TV.

Once any inadequacies or inconsistencies have been identified, recommended improvements may be determined and presented to the user. In this regard, factors that may be considered in identifying suggested replacements or additions to the equipment configuration may include:

Features and capabilities necessary to rectify the identified inadequacies;

Support for nascent technologies (i.e., future proofing);

Cost of proposed units, which factor may be influenced by the price brackets represented by the existing items of equipment;

Dimensions;

Operational compatibility, e.g., support for CEC, EDID, RF4CE, etc.;

Reliability and/or user satisfaction ratings;

Purchase statistics derived from a user's peer group, i.e., other consumers with similar equipment configurations and/or demographics.

In some circumstances, user-specified filtering parameters may also be applied during this identification process, for example upper limits on price and/or dimensions, brand preference, etc. Input of such parameters may be solicited from a user at the start of the recommendation process or may be provided during initial installation and setup of the product recommendation app, as appropriate.

In addition, where a database of device command code sets is available for reference, for example where the product recommendation app is provided by or hosted by a manufacturer of universal controlling devices, the suitability of an appliance's command set may also be taken into account, for example:

Availability of so-called "discrete" power and input selection commands in support of activity macros (preferred to avoid toggled power confusion);

Preferred method of command transmission, e.g., if a majority of the other appliances in the existing configuration support non-line-of-sight command transmissions, such as for example the RF4CE protocol, preference may be given to replacement devices which are compatible with that command protocol;

Possible conflicts in command code format with appliances already present in the existing configuration; etc.

By way of further example and without limitation, a product recommendation method may first consider which product features are mandatory. These may include for example support for formats necessary for compatibility with other existing equipment in a user's configuration (e.g., HDTV compatibility), regional requirements (supply voltage, DVD region, PAL vs NTSC, etc.), user-supplied filtering parameters such as maximum price or dimensions, etc. Next, a product selection database may be scanned and those entries which satisfy the mandatory requirements selected as entries that are eligible for further examination. In this regard, an example product recommendation database may comprise a series of product records, each record in turn comprising a series of feature definition entries, each feature definition entry comprising a series of fields holding data indicative of a feature reference or type (e.g. HD capable, HDMI input, reliability rating, user survey rating, etc.), an indicator as to whether this feature is available on that particular product, any parameter associated with that feature (e.g., screen resolution, number of inputs, etc.), a rating value, e.g., between zero to ten, representative of the completeness or functionality of that particular feature as implemented within that product, or in the case of survey results, etc., a value representing a relative ranking within that appliance's peer group, etc For a feature which is absent, the rating value entry may be zero. As will be appreciated, data values corresponding to the fields of database may be distributed across multiple locations.

Once a set of qualifying products has been selected, a weighing factor may be assigned to each of the remaining non-mandatory features based on that feature's relative importance to the known equipment configuration in which it is to be used. In some embodiments, some or all of such weighing factors may also be user-adjustable according to personal preferences, e.g., cost. After weighing factors are established, a first product record from the set of eligible records is retrieved, and a product score may be accumulated, calculated in the illustrative example as the sum of the products of each participating feature's rating and the weighing factor established previously. Thereafter, the total score for that product may be saved and the process may be repeated until all eligible products have been scored. Upon completion of score calculations, the highest scoring product may be returned as a recommendation and the process is complete.

Once suggested replacement or add-on items have been thus identified, these may be presented to the user of the device 100, by audible and/or visual means. The user may be presented with an opportunity to be informed about additional information regarding the recommended appliances. For example, a selection of a displayed product identifier may cause a display of a summary of the features of the recommended appliance together with icons representing possible next actions by the user, for example: posting the recommendation to a user's social networking account for comment using icon, comparison of the recommended item to the appliance it is to replace in the current configuration (if any), obtaining purchase information, or returning to a prior display to review other recommended appliances (if any). Merchant information for use in the purchasing option may be obtained via use of known web-scraping technologies, may be provided by the merchants themselves (e.g., via an affiliates agreement), or the like.

Considering now the product compatibility or "shopping companion" mode, a consumer may wish to use the device 100 to verify the compatibility of a particular electronic appliance with their existing configuration, based upon for example an advertisement, a recommendation from a friend or a salesperson, a store display, etc. In such cases, a listing of the user's currently configured electronic appliances may be displayed and the user may be afforded an opportunity to remove from that configuration any device which is to be replaced by the new appliance under consideration. After completing any such input, a user may confirm the remaining equipment configuration and proceed to identify the type, brand, and model of appliance under consideration. Such identification may be by selection from a drop-down list, direct text entry with or without auto-complete, etc., as appropriate. In addition, the system may automatically identify the appliance under consideration from an uploaded photograph of the appliance under consideration, its packaging, or the like; from a captured product code associated with the appliance under consideration such as for example a UPC barcode, an RFID tag, or the like; etc. Yet further, the appliance may be an appliance that is being advertised to the user.

Once the identification information is provided a compatibility check algorithm may be performed. The factors considered in this process may be similar to those previously enumerated above. In addition, the compatibility check may incorporate further steps such as verifying that a sufficient number of suitable connections and input/output ports are available to allow optimal integration of the proposed appliance, etc. Once compatibility checking is complete, the result may be presented to the user. An example presentation may include a summary of the salient points considered in determining compatibility. Some embodiments may include an option for the display of additional information screens containing, for example, recommended interconnection schemes and methods, etc. In addition, options for posting to social media and locating a merchant may be offered as previously described.

By way of further example, when a new TV is provisioned in the system, the software agent may determine a set of recommended accessories such as a compatible wall bracket and speakers. The recommendations may be displayed by the app in a GUI on the device 100 or on a TV in communication with the device 100 where the user can select to purchase directly by selecting the corresponding link (image). The options provided to the user for purchase are preferably based on the other appliances in the home and by the cloud service determining from its local library which accessories are compatible with the new TV.

In a further example, the voice enabled systems may be utilized to offering interactive advertising. In one contemplated embodiment, a traditional tile on a home page of a Smart TV can be provided with a tile icon that represents the brand or product paying for the ad. When a user selects the ad, a virtual voice agent will interact with the user and the user some questions to find the best and most personalized product offering under the brand. In another contemplated embodiment, the "virtual agent" that includes functionality to provide first stage technical support for common issues and queries related to AV and smart home devices can be further used to proactively offer up paid recommendations on products or services that can improve the smart home or AV system of the user. Still further, it is contemplated that the interactive advertising can be in the form of an interactive side-bar that is shown next to linear content ads that allows the user to learn more and ask questions about the product seen in the linear ad. Yet further, an implementation is contemplated that will monitor ongoing voice interactions by the user, and when user asks for something not natively offered by the TV (such as "order pizza", or "who has the best pizza"), the agent will offer up paid recommendations within context.

As will be appreciated, the foregoing describes an example method in which a virtual voice assistant is used to optimize a utilization of a home entertainment system having at least a first device that receives a first data that identifies the first device, that responds to a user interacting with an ad icon that represents a brand or product paying for the ad icon by causing the virtual voice assistant to interact with the user to obtain an information about a product of interest, that causes the first data and the information about the product of interest to be provided to a product recommendation application wherein the product recommendation application will use the first data and the information about the product of interest to identify within a data store one or more products having one or more features complimentary with one or more capabilities of the first device, and that causes the one or more recommended products to be presented to the user.

Figure 8:
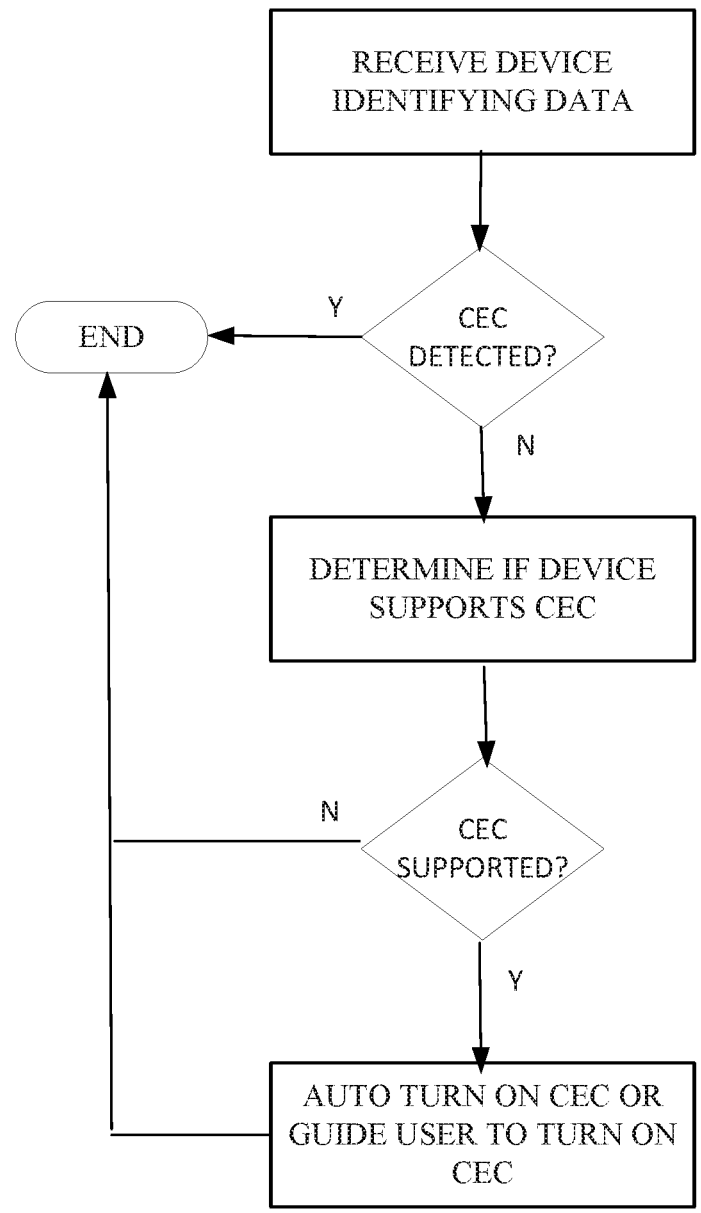
FIG. 8 illustrates an example method for facilitating an enabling of a functionality of a first device.

Turning to FIG. 8, a method for facilitating an enabling of a functionality of a first device is illustrated. Generally, the method uses device identifying features, such as brand, model series, year of manufacturing, etc., to predict if a device in a home theater system supports a functionality, e.g., to predict CEC supported or not. If it is found that the device supports a functionality of interest, e.g., CEC is supported, and it is found that the functionality of interest is not enable, the method can instruct/prompt the user to enable the CEC feature in the device. For example, the instructions can inform a user how the user can navigate a menu to locate and enable the functionality of interest and, additionally, inform the user why enabling the functionality would be beneficial to the user. In the case of CEC being the functionality of interest, it will be appreciated that, by enabling CEC, CEC signatures can be collected for future use by the system (e.g., for use in modeling as described below) and the system can be configured to allow for the use of CEC commands to control the device as described above. To this end, in response to CEC being enabled, the system may perform steps described above as needed to update control matrices. For example, in response to CEC being enabled, the system may update a control matrix to indicate that one or more commands for the device, such as power, input selection, etc., are to be transmitted via use of the now enabled CEC as opposed to some prior selected protocol, such as IR.

More particularly, the method illustrated in FIG. 8, which may be executed by any device within the system to which a device of interest is coupled, will receive from the device or interest (and/or from a user and/or from another device, such as a remote control, configured to communicate with the device of interest) data/information that is to be used to determine if the device of interest supports a given functionality, such as CEC. For example, and as described previously, device identifying data, such as data indicative of the brand, device, model, device type etc., may be obtained by reading the metadata from a device, from a device signature (IF/EDID/mDNS/SSDP etc.), may be read from a bar code, entered by a user, etc. Once the device identifying data is obtained, the data may be compared to information stored in a database, whether local or remote, to determine if: a) the device of interest is recognized; and b) the device of interest is known to support a given functionality, e.g., is CEC capable as also described previously.

When the device identifying data allows for the identification of the device of interest within the database, it is determined if the information in the database indicates that the device of interest supports CEC. If the information in the database indicates that the device of interest does support CEC and further information obtained about the current state of the device of interest indicates that CEC is not enabled for the device of interest (which information may be discerned by the failure of the device to respond to provided commands in a manner that would indicate that CEC—or the functionality of interest—is enabled), the system may notify the user and present to the user instructions on how to enable CEC on the device of interest to thereby upgrade the interconnectivity as described above, e.g., the system can cause a display of commands to prompt user to turn the feature (CEC) on and/or may use a voice enable assistant to recite voice commands to educate and prompt the user to turn the feature (CEC) on. If the system is capable of issuing commands to the device to perform this automatically (which commands would most likely be in the form of menu navigation commands transmitted from a controlling device), such action may be performed.

When the identifying information is not cross-referenced to a device in the database, the system may provide the identifying information to an artificial intelligence engine that will use the identifying information to predict if the device of interest supports a functionality of interest, e.g., whether is CEC supported or not. If the modeling used by the artificial intelligence engine predicts that the device of interest is likely to support CEC, e.g., it is determined that the device identifying data for the device of interest, i.e., the fingerprint for the device of interest, is similar to the device fingerprint of another device that is known to support a given functionality, such as CEC, the system may instruct the user to try to turn on/enable the functionality on the device of interest if it is further determined by the system that the current state of the device of interested indicates that the functionality is not enabled. In this case, the instructions provided to the user may be those instructions that would have been used to turn on the functionality of in the device (or devices) the system predicted is most likely to correspond to the device of interest that the system is trying to configure.

With respect to the artificial intelligence engine, the system uses the attribute information obtained from the millions of devices that are known to the current assignee, e.g., attributes such as whether a given device is CEC enabled or not, to create a machine learning model which will, based on features/attributes such as brand, model, device class, region year of manufacture etc., predict if a device of interest supports a given functionality, e.g., is CEC enabled or not. Preferably, the collected data, which will contain information about the device such as Brand, Device, Model, Year of mfg., no. of HDMI ports, CEC support, etc. is cleaned of unwanted/unnecessary information and structured for analysis. After the cleaning, the data is analyzed to see the correlation between a feature and target variables. To this end, a unique binary encoding dictionary is created and applied to encode the features like:

Brand—encoded to ignore any non-addressable anomalies ('samsung'—'samsunh', 'samsung'—'samSung' will be treated as being identical feature wise using the encoding.)

Model—encoded to take into account similar model series (models in a series have mostly identical features and functions, e.g. Samsung TV's xyz1, xyz2, xyz3 will have maximum feature similarity.)

It will also be appreciated that the applied encoded format is also intended to make the whole algorithm memory efficient and performance optimized and that the data is to be split into training and test sets, for example using scikit learn's train test split, for validating the performance of the model built in the next step.

In one example a random forest approach is used. To this end, scikit learn's implementation of the algorithm with case-based parameter tuning is utilized to get optimum accuracy metrices on the validation data while training the model to predict if the device is CEC enabled. In another example a neural network approach is used. To this end, Kera's deep learning framework built on tensorflow is used to build an Artificial Neural Network with 3 hidden layers using relu as activation. Hyper parameters are used to tune the model with the existing training data to get maximum performance and optimum accuracy matrix.

It will be appreciated that the foregoing describes a system that will provide a better user experience along with auto detecting connected devices and guiding the user so that the user can apply CEC commands to control a client-side application. Furthermore, while described in the context of CEC and devices within a home theater system, it will be understood that the descriptions set forth above would be equally usable to inform a user of other device functionalities that a user may need to or should turn on. For example, the same system and method could be used to sense an audio output device that is wired connected to an audio source device and the system may recognize that the devices are Bluetooth capable and, as such, may instruct the user how to enable Bluetooth on a device and how to pair the devices for communication.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents and patent applications cited within this document are hereby incorporated by reference in their entirety.

What is claimed is:

1. A method for facilitating an enabling of a functionality of a first device, comprising:
    causing a first data that identifies the first device to be used to determine that the first device supports the functionality;
    determining that the functionality of the first device is not enabled;
    in response to determining that the function of the first device is not enabled, causing a set of instructions for enabling the functionality of the first device to be presented to a user; and
    in response to the user providing input to the first device in accordance with the set of instructions, enabling by the first device the functionality of the first device;
    wherein the functionality of the first device comprises the ability of the first device to respond to commands issued according to a predetermined communications protocol and the predetermined communications protocol comprises a Consumer Electronics Control ("CEC") command transmission protocol.

2. The method as recited in claim 1, wherein causing the first data that identifies the first device to be used to determine that the first device supports the functionality comprises causing the first data to be used to locate an entry in a data store that corresponds to the first device and wherein the entry in the data store stores data that indicates that the first device supports the functionality.

3. The method as recited in claim 1, wherein causing the first data that identifies the first device to be used to determine that the first device supports the functionality comprises causing the first data to be provided to an artificial intelligence engine adapted to use the first data to identify a second device that the artificial intelligence engine determines is an equivalent to the first device, causing a second data that identifies the second device to be used to locate an entry in a data store that corresponds to the second device, wherein the entry in the data store stores data that indicates that the second device supports the functionality, and using the data that indicates that the second device supports the functionality to predict that the first device supports the functionality.

4. The method as recited in claim 1, wherein the first data comprises data provided to configure a remote control to communicate commands to the first device.

5. The method as recited in claim 1, wherein the first data comprises a device identifying fingerprint constructed from information received from the first device.

6. The method as recited in claim 1, wherein a communications link between the first device and a second device is monitored to determine that the functionality of the first device is not enabled.

7. The method as recited in claim 1, wherein the set of instructions are presented to the user by causing a virtual voice assistant to audiblize the set of instructions.

8. The method as recited in claim 1, wherein the set of instructions are presented to the user by causing a display device to display the set of instructions.

9. A first device in a home entertainment system that includes the first device and a second device, the first device comprising:
- a communications interface that couples the first device with the second device;
- a processing device; and
- a memory storing instructions executable by the processing device wherein the instructions, when executed by the processing device, cause the first device to perform steps for facilitating an enabling of a functionality of the second device, the steps comprising:
- causing a first data that identifies the second device to be used to determine that the second device supports the functionality;
- determining that the functionality of the second device is not enabled; and
- in response to determining that the functionality of the second device is not enabled, causing a set of instructions for enabling the functionality of the second device to be presented to a user;
- wherein the functionality of the second device comprises the ability of the second device to respond to commands issued according to a predetermined communications protocol via the communications interface and the predetermined communications protocol comprises a Consumer Electronics Control ("CEC") command transmission protocol.

10. The first device as recited in claim 9, wherein causing the first data that identifies the second device to be used to determine that the second device supports the functionality comprises causing the first data to be used to locate an entry in a data store that corresponds to the second device and wherein the entry in the data store stores data that indicates that the second device supports the functionality.

11. The first device as recited in claim 9, wherein causing the first data that identifies the second device to be used to determine that the second device supports the functionality comprises causing the first data to be provided to an artificial intelligence engine adapted to use the first data to identify a third device that the artificial intelligence engine determines is an equivalent to the second device, to cause a second data that identifies the third device to be used to locate an entry in a data store that corresponds to the third device, wherein the entry in the data store stores data that indicates that the third device supports the functionality, and to use the data that indicates that the third device supports the functionality to predict that the second device supports the functionality.

12. The first device as recited in claim 9, wherein the first data comprises data provided to configure a remote control to communicate commands to the second device and received by the first device from the remote control.

13. The first device as recited in claim 9, wherein the first data comprises a device identifying fingerprint constructed from information received from the second device via the communications interface.

14. The first device as recited in claim 9, wherein the instructions cause the first device to monitor the communications link between the first device and the second device to determine that the functionality of the second device is not enabled.

15. The first device as recited in claim 9, wherein the instructions cause first device to audiblize the set of instructions.

16. The first device as recited in claim 9, wherein the instructions cause the first device to set display the set of instructions via a display device coupled to the first device.

17. The first device as recited in claim 9, wherein the first device comprises a media source device and the second device comprises a media rendering device.

18. The first device as recited in claim 17 wherein the media source device comprises a settop box and the media rendering device comprises a television.

* * * * *